US012735143B2

(12) United States Patent
Ziemer

(10) Patent No.: US 12,735,143 B2
(45) Date of Patent: Sep. 15, 2026

(54) DRIVE ASSEMBLY FOR A BICYCLE, AND BICYCLE

(71) Applicant: ZF Friedrichshafen AG, Friedrichshafen (DE)

(72) Inventor: Peter Ziemer, Bad Woerishofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/682,557

(22) PCT Filed: Jul. 27, 2022

(86) PCT No.: PCT/EP2022/071033

§ 371 (c)(1),
(2) Date: Feb. 9, 2024

(87) PCT Pub. No.: WO2023/016801

PCT Pub. Date: Feb. 16, 2023

(65) Prior Publication Data

US 2025/0136245 A1 May 1, 2025

(30) Foreign Application Priority Data

Aug. 10, 2021 (DE) ......................... 102021208703.5

(51) Int. Cl.
*B62M 11/18* (2006.01)
*B62L 1/00* (2006.01)
(Continued)

(52) U.S. Cl.
CPC .............. *B62M 11/18* (2013.01); *B62L 1/005* (2013.01); *B62M 6/60* (2013.01); *B62M 11/145* (2013.01);
(Continued)

(58) Field of Classification Search
CPC ...... B62M 11/18; B62M 6/60; B62M 11/145; B62M 6/55; B62L 1/005; F16H 1/32;
(Continued)

(56) References Cited

FOREIGN PATENT DOCUMENTS

| | | | | |
|---|---|---|---|---|
| DE | 102013108549 B4 * | 10/2015 | ............ | B60L 11/007 |
| DE | 102016211000 A1 | 1/2017 | | |

(Continued)

OTHER PUBLICATIONS

German Search Report for Application No. 102021208703.5 dated Feb. 25, 2022.

(Continued)

*Primary Examiner* — Justin Holmes
(74) *Attorney, Agent, or Firm* — Dority & Manning, P.A.

(57) ABSTRACT

The present invention relates to a drive assembly (100; 200; 300; 400; 500) for a bicycle. The drive assembly (100; 200; 300; 400; 500) has a bottom bracket gearbox (10), a prime mover (18) and a planetary assembly (110, 412). The planetary assembly (110, 412) includes a first planetary gear set (110) having a first rotary element, a second rotary element and a third rotary element. The drive assembly (100; 200; 300; 400; 500) has a stationary component (22) and a first brake shift element (B1). The first rotary element is mechanically operatively connected to the output (20) of the prime mover (18). The second rotary element is in the form of an output of the planetary assembly (110). The third rotary element is rotationally fixable on the stationary component (22) by the brake shift element (B1).

20 Claims, 4 Drawing Sheets

(51) Int. Cl.

| | |
|---|---|
| ***B62M 6/60*** | (2010.01) |
| ***B62M 11/14*** | (2006.01) |
| *B62M 6/55* | (2010.01) |
| *F16H 1/32* | (2006.01) |

(52) U.S. Cl.
CPC ................. *B62M 6/55* (2013.01); *F16H 1/32* (2013.01); *F16H 2200/2005* (2013.01); *F16H 2200/2007* (2013.01); *F16H 2200/2033* (2013.01); *F16H 2200/2035* (2013.01); *F16H 2200/2082* (2013.01); *F16H 2200/2084* (2013.01)

(58) Field of Classification Search
CPC ..... F16H 2200/2005; F16H 2200/2007; F16H 2200/2033; F16H 2200/2035; F16H 2200/2082; F16H 2200/2084

See application file for complete search history.

(56) References Cited

FOREIGN PATENT DOCUMENTS

| | | | | | |
|---|---|---|---|---|---|
| DE | 112015005797 | T5 * | 9/2017 | .............. B62L 5/006 |
| DE | 102016225158 | A1 * | 6/2018 | |
| DE | 102017219606 | A1 | 5/2019 | |
| DE | 102018208380 | A1 | 11/2019 | |
| DE | 102018208382 | A1 * | 11/2019 | ............... F16H 3/66 |
| DE | 102018217096 | A1 | 4/2020 | |
| DE | 102021208703 | B3 | 8/2022 | |
| JP | H10194186 | A * | 7/1998 | |
| WO | WO-2016034574 | A1 * | 3/2016 | ............ B62M 11/14 |
| WO | WO2017083970 | A1 | 5/2017 | |

OTHER PUBLICATIONS

International Search Report for application No. PCT/EP2022/071033 Dated Oct. 27, 2022.

* cited by examiner

DRIVE ASSEMBLY FOR A BICYCLE, AND BICYCLE

CROSS-REFERENCE TO RELATED APPLICATIONS

The present application is a U.S. national phase of PCT/EP2022/071033 filed on Jul. 27, 2022 and is related and has right of priority to German Patent Application No. DE102021208703.1 filed on Aug. 10, 2021, both of which are incorporated by reference in their entireties for all purposes.

TECHNICAL FIELD

The present invention relates generally to a drive assembly for a bicycle and to a bicycle having such a drive assembly.

BACKGROUND

DE 10 2018 208 380 A1 describes a multi-stage gearbox of a planetary design for a pedelec. An electric motor is axially parallel to the multi-stage gearbox and mechanically operatively connected or connectable to a gearbox output shaft, for example, via an optional shift element in the form of a freewheel clutch. During pedaling, the electric motor can therefore be decoupled in order to avoid concurrent rotation, which is associated with drag torque, in the disengaged state. In addition, a powershift is possible due to the connection to the gearbox output shaft. A load can be applied by the electric motor during a gear change operation in the multi-stage gearbox, thereby switching the multi-stage gearbox to a no-load state.

SUMMARY

A first example aspect of the invention relates to a drive assembly for a bicycle. The drive assembly can provide a drive torque for driving the bicycle, for example, at a rear wheel. The drive force can be provided therefor with muscle power and, alternatively or additionally, by a prime mover. The bicycle can be a transport for a person, the bicycle having, for example, two wheels and one handlebar.

The drive assembly includes a bottom bracket gearbox. The bottom bracket gearbox is designed to transmit a torque to a wheel of the bicycle, for example, from an input of the bottom bracket gearbox. The bottom bracket gearbox can have an input and an output. An input can be designed to supply a variable which is to be converted and an output can be designed to output the converted variable. The bottom bracket gearbox can be designed to provide multiple gears, each of which has an associated transmission ratio. The bottom bracket gearbox can be in the form of a multi-stage bottom bracket gearbox. By the gearbox, a torque can be transmitted from an input of the gearbox to an output of the gearbox. For example, the bottom bracket gearbox allows for a slow rotation at an input, for example from a pedal crank, to be converted into a faster rotation at the output of the bottom bracket gearbox and thus, for example, at a driven wheel of the bicycle. In each gear there can be a fixed mechanical transmission ratio between the input and the output of the bottom bracket gearbox. The bottom bracket gearbox can be mounted, for example, in a bottom bracket shell of the bicycle. The output of the bottom bracket gearbox can be permanently mechanically operatively connected to the wheel or, for example, operatively connectable to the wheel via a freewheel clutch. The mechanical operative connection can be provided, for example, via a chain, a belt or a spur gear drive.

For example, it can be provided that the drive assembly includes a pedal crankshaft. The drive assembly can be designed such that a torque is transmittable from the pedal crankshaft to the input of the bottom bracket gearbox. The pedal crankshaft can be mounted, for example, in a bottom bracket shell of the bicycle. The pedal crankshaft can be designed, for example, such that respective cranks having pedals for driving the bicycle are drivable at the pedal crankshaft at least partially by muscle power. The pedal crankshaft can be, for example, permanently mechanically operatively connectable to the input of the bottom bracket gearbox or permanently mechanically operatively connected to the input of the bottom bracket gearbox. For example, the input of the bottom bracket gearbox can be formed by the same shaft as the pedal crankshaft. The pedal crankshaft can be in the form of the input of the bottom bracket gearbox. The pedal crankshaft can also be connected or connectable, however, to the input of the bottom bracket gearbox, for example, by a shift element such as a freewheel clutch. The pedal crankshaft can extend axially on a central rotational axis of the bottom bracket gearbox centrally entirely through the bottom bracket gearbox.

The drive assembly includes a prime mover. The prime mover has an output. The output of the prime mover can correspond, for example, to a rotor of the prime mover. The output of the prime mover can be formed by an output shaft of the prime mover. The prime mover can be in the form, for example, of an electric motor. The electric motor can be designed for recuperation. A drive torque can be provided, for example, by the prime mover. The drive assembly including the prime mover can make a motor-assisted bicycle possible and, for example, can be used in a pedelec. The electric motor can be designed to convert electrical energy into a drive torque. The drive assembly can include a control device and a power supply, such as a battery, for the prime mover. The prime mover can assist the rider of the bicycle during propulsion. In addition, the prime mover can assume the load during the gear change operation of the bottom bracket gearbox and thus allow for a no-load gear change operation. When the prime mover is switched off, the prime mover can be decoupled, for example, from the drive train and the bottom bracket gearbox in order to avoid drag torques. The prime mover can be axially parallel to the bottom bracket gearbox.

The drive assembly includes a planetary assembly. The planetary assembly is designed to transmit torque from the output of the prime mover onto the wheel of the bicycle. The planetary assembly includes a first planetary gear set having a first rotary element, a second rotary element and a third rotary element. In addition, the planetary assembly includes a stationary component. The planetary assembly also includes a brake shift element. As a result, a drive torque of the prime mover can be transmitted in different ratios. The rotary elements can be in the form, for example, of a sun gear, a ring gear and a planet carrier. The rotary elements of a planetary gear set can be mechanically operatively connected to one another by respective planet gears, which are rotatably mounted on the planet carrier and mesh with the sun gear and, alternatively or additionally, with the ring gear. The planetary assembly can be more compact in comparison to a connection of the prime mover by respective spur gear stages. In addition, additional functions can be easily integrated. Such additional functions can be a lock-up in order to provide immobilization, a parking lock and, alternatively or additionally, theft protection. A hill holder function, recuperation and, alternatively or additionally, assistance with pushing the bicycle backwards can be integrated in this way. In addition, a planetary assembly can meet high requirements better than a spur gear drive, which high requirements can arise during long uphill journeys and under high transport loads. Therefore, the drive assembly is particularly suitable for e-mountain bikes and electrically assisted cargo bicycles. The planetary assembly can be shiftable in order to allow for different transmissions of torque from the prime mover to the wheel and, alternatively or additionally, to activate and deactivate additional functions. In addition, the planetary assembly can be designed to decouple the prime mover. The output of the prime mover can be operatively connectable to the wheel for torque transmission.

The first rotary element is mechanically operatively connected, for example, permanently mechanically operatively connected to the output of the prime mover. The output shaft of the prime mover can be formed integrally, for example, with the first rotary element. The second rotary element is in the form of an output of the planetary assembly. The converted variable can be provided to the wheel at the output of the planetary assembly or the second rotary element. The third rotary element is rotationally fixable on the stationary component by the brake shift element. As a result, for example, a transmission ratio can be changed or the prime mover can be decoupled from the wheel.

A permanently corotational connection of two elements should be understood as a connection in which the two elements are substantially rigidly coupled to one another in all proper states of the gearbox. The elements can be in the form of individual components which are connected to one another for conjoint rotation or are integrally formed. If two elements are mechanically operatively connected, however, these elements are directly or indirectly coupled to one another such that a movement of one element induces a response by the other element. Further elements, for example, one or more spur gear stages, can be provided between the elements. If two elements are connectable to one another, these elements can be either disconnected from one another or connected to one another by a shift element, for example, via the actuation of the shift element.

The brake shift element can be a friction-locking shift element such as, for example, a multi-disk clutch. The respective brake shift elements can be designed to prevent rotation of a rotary element connected thereto, or to reduce the rotation thereof, for example, to a stop. A shift element can be designed to shiftably connect two rotary elements to one another for conjoint rotation. A brake shift element is a shift element which is designed to shiftably connect a rotary element to the stationary component for conjoint rotation. If a shift element, for example, a clutch, is provided between two elements of the drive assembly, these rotary elements are not permanently connected to each other for conjoint rotation, but rather are connectable to each other for conjoint rotation via the shift element. A corotational connection is established only via actuation or an automatic state change of the intermediate shift element. An actuation of the shift element can mean that the shift element is transferred into an engaged state such that the components which are directly coupled to the shift element can be synchronized in terms of their rotational motions. If the shift element concerned is in the form of an interlocking shift element, the components which are directly connected to one another for conjoint rotation via the shift element rotate at the same rotational speed. One example of an interlocking shift element is a dog clutch. In the case of a friction-locking shift element, rotational speed differences between the components can arise even after the shift element has been actuated. This intentional or also unintentional state is nevertheless referred to here as a corotational connection of the particular components. In a frictional connection, there can be a certain speed difference between the two interconnected elements, for example, due to slip. The shift elements can be actively actuated via a gear change device, for example, by a cable pull of a manual gearbox.

The brake shift element can also be in the form of a brake freewheel unit. The brake freewheel unit locks the rotary element, which is connected thereto, in one direction of rotation by rotationally fixing the rotary element on the stationary component. This is also referred to as a locking direction state. A freewheel is provided in an opposite direction of rotation, for example, by not rotationally fixing the rotary element, which is connected to the brake freewheel unit, on the stationary component. This is also referred to as an overrun operation state.

The stationary component can be, for example, a housing of the gearbox or a even portion of a bicycle frame. A stationary component can be, for example, a component which is immovable relative to the rotary elements of the gearbox. The stationary component can also be formed by multiple elements which are spaced apart from one another.

In one example embodiment it is provided that the second rotary element is mechanically operatively connected to the output of the bottom bracket gearbox. As a result, a torque from the prime mover can be transmitted into the drive train of the bicycle at the output of the bottom bracket gearbox. An axial offset is therefore made possible. The mechanical operative connection can be provided, for example, via a chain, a belt or a spur gear drive. A pinion, which engages into the chain or belt or forms part of the spur gear drive, can be, for example, permanently connected to the second rotary element for conjoint rotation.

In one example embodiment it is provided that the first planetary gear set is in the form of a negative planetary gear set. A negative planetary gear set can be compact and have a high efficiency. The first rotary element can be in the form of a sun gear. The second rotary element can be in the form of a planet carrier. The third rotary element can be in the form of a ring gear. A negative planetary gear set has a negative stationary gear ratio and a positive planetary gear set has a positive stationary gear ratio. Planet gears can be rotatably mounted on the planet carrier. In negative planetary gear sets, one set of planet gears is usually sufficient, which can yield advantages with respect to cost and friction. In the negative planetary gear set, respective planet gears of a planetary gear set can mesh with the ring gear and the sun gear of the negative planetary gear set.

For another transmission ratio, the first rotary element in the negative planetary gear set can be in the form of a ring gear and the third rotary element can be in the form of a sun gear.

Alternatively, the first planetary gear set can be in the form of a positive planetary gear set. In this case, the second rotary element can be in the form of a ring gear and the third rotary element can be in the form of a planet carrier. The positive planetary gear set can have two sets of planet gears. The planet gears of one set can mesh with the first sun gear, and the planet gears of another set can mesh with the first ring gear. Respective planet gears of the two sets of planet gears can then mesh with one another in pairs.

In one example embodiment it is provided that the first brake shift element is in the form of a brake freewheel unit.

A brake freewheel unit can be a brake shift element which automatically changes its state. A brake freewheel unit can be a freewheel clutch which connects a rotary element to the stationary component and thus rotationally fixes the rotary element. A freewheel clutch can be a clutch which acts in only one direction of rotation. Two elements which are connectable to each other for conjoint rotation by a freewheel clutch are permanently connected to each other for conjoint rotation in one direction of rotation of these two elements relative to each other. Elements which are connected to each other for conjoint rotation rotate at the same rotational speed. In an opposite relative direction of rotation, which can also correspond to the driven element overriding the driving element, the two elements are not connected to one another or decoupled from one another by the freewheel clutch. When the relative direction of rotation reverses from a freewheel direction to a coupling direction, the freewheel clutch can automatically lock up. The freewheel clutch can be in the form, for example, of a pawl freewheel or a one-way roller clutch. A freewheel clutch can be a shift element which does not need to be actively engaged and disengaged. As a result, the gearbox can be nested to a greater extent and can be more compact. For example, a brake freewheel unit is not actuated and, therefore, also does not need to be accessible for actuation. As a result, a brake freewheel unit in the gear set arrangement can be enclosed radially from the outside by a hollow shaft or another rotary element. As compared, for example, to a clutch freewheel, a lower differential speed can be present in the overrun operation at the first rotary element of the first planetary gear set. In addition, in the brake freewheel unit, lower supporting factors as compared to a clutch freewheel can arise at the second rotary element.

In one example embodiment it is provided that the first brake shift element is in the form of a shiftable brake. A shiftable brake can be a shiftable element which connects a rotary element to the stationary component and thus rotationally fixes the rotary element. A brake can be a friction-locking shift element such as, for example, a multi-disk clutch. Respective brakes can be actively actuated by a gear change device, for example, by a cable pull of a manual gearbox. A brake is easily actuated in this case, since one of two brake elements is connected to the stationary component and thus does not rotate during operation. The activation or deactivation of the shiftable brake is, for example, simpler than the activation or deactivation of a shiftable clutch which can connect two rotary elements to one another for conjoint rotation. The shiftable brake can be free of a freewheel. The shiftable brake can also enable the prime mover to be driven using the wheel during travel in order to enable recuperation. The effective range can be increased in this way. In addition, the drive assembly can also provide assistance using the prime mover when bicycle is pushed backwards.

In one example embodiment it is provided that the drive assembly has a second brake shift element. By the second brake shift element, either the first rotary element or the second rotary element can be rotationally fixable on the stationary component. As a result, additional functions such as a hill holder function or a parking lock can be provided using simple mechanisms. The brake shift element can be part of the planetary assembly.

In one example embodiment it is provided that the second brake shift element is in the form of a shiftable brake freewheel unit. A shiftable brake freewheel unit can combine the function of a shiftable brake and a brake freewheel unit. For example, the shiftable brake freewheel unit can automatically rotationally fix the rotary element connected thereto on the stationary component in one direction of rotation, and, in an opposite direction of rotation, shiftably rotationally fix the rotary element connected thereto on the stationary component. A hill holder function can be provided by the shiftable brake freewheel unit. A shiftable brake freewheel unit can be designed to always provide a freewheel in one direction of rotation of the rotary element connected thereto. In an opposite direction of rotation, the rotary element is then rotationally fixed on the stationary component when the brake shift element is actuated. In the opposite direction of rotation, the rotary element is also not rotationally fixed on the stationary component when the brake shift element is not actuated. There are also example embodiments of shiftable brake freewheel units in which the rotary element connected thereto is always rotationally fixed on the stationary component in one direction of rotation, since the freewheel unit blocks. In the opposite direction of rotation, the rotary element connected thereto is rotationally fixed on the stationary component in this example embodiment only when the shiftable brake freewheel unit is actuated. Otherwise, rotational fixation is not brought about in this direction of rotation. A brake shift element can be actuated, for example, via a pawl, which is arranged in the housing and is operatively connected to a gear selector drum. In a brake ring, the pawl and its tooth system are operative on each side for an interlocking brake. The pawl and its tooth system are to be operative on only one side, however, for an interlocking brake freewheel unit. As a result, the shiftable brake freewheel unit can be compactly provided in one component.

In one example embodiment it is provided that the second brake shift element is in the form of a shiftable brake. As a result, for example, a parking lock can be provided, since the drive assembly can be locked in this way. For this purpose, it can be necessary for the first brake shift element and the second brake shift element to each be in the form of a shiftable brake. In addition, recuperation can be possible in this way, for example, when the output of the drive assembly is permanently mechanically operatively connected to the wheel, and assistance can be provided for pushing the bicycle backwards.

In one example embodiment it is provided that the drive assembly has a second planetary gear set and a third brake shift element. As a result, additional transmission ratios can be provided for the drive force of the prime mover. The planetary assembly can include a fourth rotary element, a fifth rotary element and a sixth rotary element. The torque from the prime mover can be transmittable to the wheel of the bicycle via the first planetary gear set and, alternatively or additionally, the second planetary gear set. The second planetary gear set can also be shiftable, in order to change a transmission ratio. As a result, a second drive force transmission ratio can be provided in order to increase a starting torque and, alternatively or additionally, improve a grade climbing ability of the bicycle. The drive assembly can be free of the above-described second brake shift element. The drive assembly can therefore include, for example, only the first brake shift element and the third brake shift element. The numbering is then used merely for the purpose of assignment.

In one example embodiment it is provided that the second planetary gear set is in the form of a negative planetary gear set. Such a drive assembly can then be particularly efficient and compact. The fourth rotary element can be in the form of a sun gear. The fifth rotary element can be in the form of a planet carrier. The sixth rotary element can be in the form of a ring gear.

The fourth rotary element can be mechanically operatively connected, for example, to the output of the prime mover. For example, the fourth rotary element can be permanently connected to the first rotary element for conjoint rotation. The fourth rotary element and the first rotary element can be formed by a common shaft. The fifth rotary element can be permanently connected to the second rotary element for conjoint rotation. The fifth rotary element can be in the form, for example, of the output of the planetary assembly. For example, the fifth rotary element and the second rotary element can be in the form of a common shaft.

The fifth rotary element and the second rotary element can be permanently connected for conjoint rotation. The sixth rotary element can be rotationally fixable to the stationary component by the third brake shift element.

The numbering of the rotary elements and of the planetary gear sets can be used merely for the purpose of assignment. Respective planetary gear sets can be free of additional elements which are not described. The drive assembly can be free of additional planetary gear sets, shift elements and other components, which are not described.

In one example embodiment it is provided that the third brake shift element is in the form of a shiftable brake freewheel unit. As a result, two gears can be implementable. Only two shift positions can be necessary, for example, for the actuation, in particular in connection with a first brake shift element which is in the form of a brake freewheel unit. The first brake shift element and the third brake shift element can be in the form, for example, of a double shift element, which allows for only one alternate actuation of the two brake shift elements.

In one example embodiment it is provided that the third brake shift element is in the form of a shiftable brake. The third brake shift element can therefore be free of a freewheel unit. As a result, particularly many functions can be made possible, such as assistance when bicycle is pushed backwards and immobilization. In addition, recuperation can also be enabled in two gears. For the immobilization, at least two of the brake shift elements can be in the form of a shiftable brake, which are simultaneously actuatable. For example, the first brake shift element and the third brake shift element can be simultaneously actuatable in order to lock the planetary assembly.

A second example aspect of the invention relates to a bicycle. The bicycle has a drive assembly according to the first example aspect. Respective further example features, embodiments, and advantages are found in the descriptions of the first example aspect.

DETAILED DESCRIPTION

Figure 1:
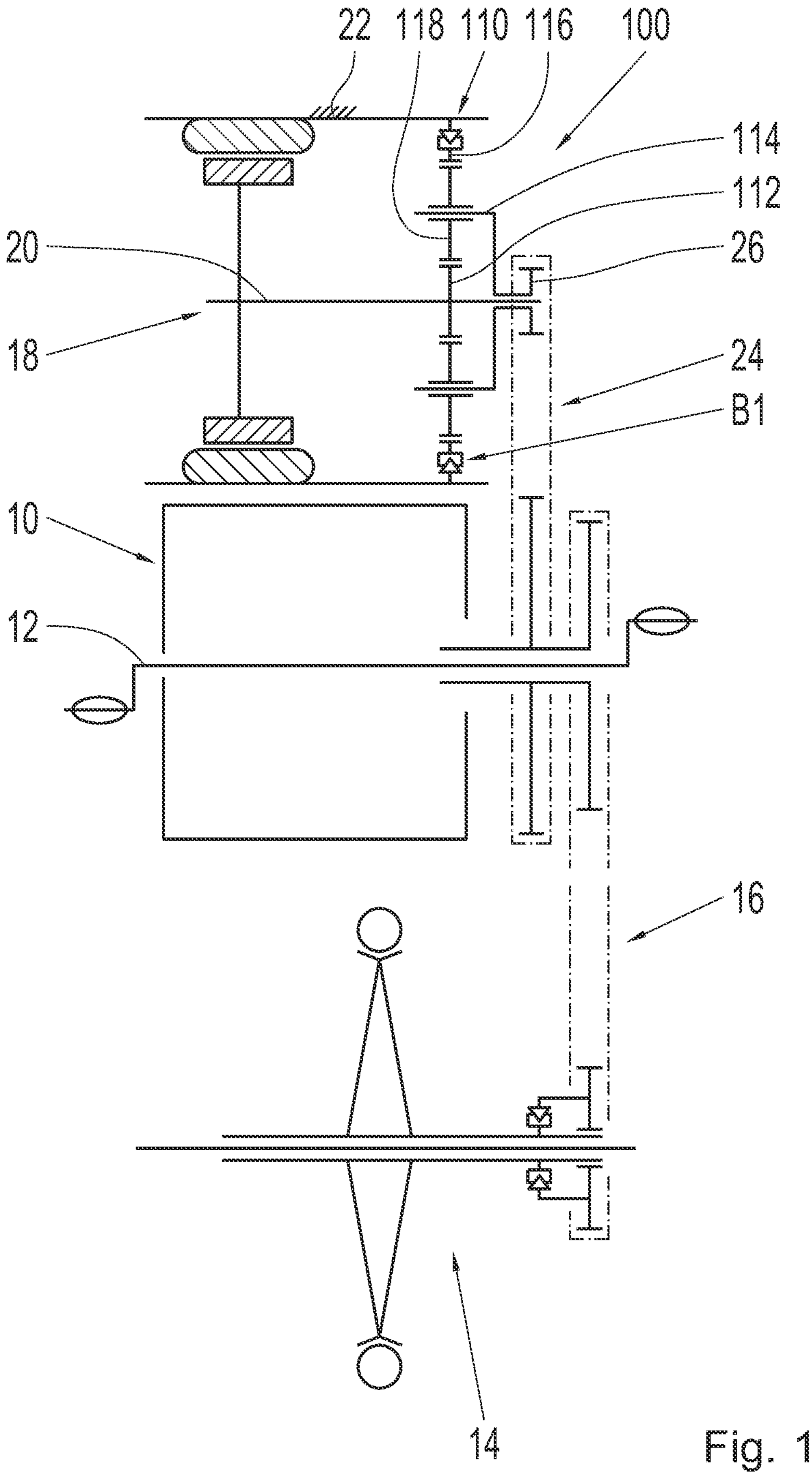
FIG. 1 shows a schematic view of a first example embodiment of a drive assembly of a bicycle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a first example embodiment of a drive assembly 100 of a bicycle. The drive assembly 100 has a multi-stage bottom bracket gearbox 10, through which a pedal crankshaft 12 centrally extends. The bottom bracket gearbox 10 is driven by the pedal crankshaft 12 and converts a drive force for provision at a wheel 14 of the bicycle. For this purpose, an output of the bottom bracket gearbox 10 is mechanically operatively connected or operatively connectable to the wheel 14 by a secondary drive 16. In the example shown, the secondary drive 16 is in the form of a chain or a belt. The wheel 14 is axially parallel to the bottom bracket gearbox 10.

In addition, the drive assembly 100 includes a prime mover 18 having an output 20, a planetary assembly and a stationary component 22. The output 20 is permanently connected to an input of the planetary assembly for conjoint rotation. An output of the planetary assembly is permanently mechanically operatively connected to the output of the bottom bracket gearbox 10 by a primary drive 24 and thus also is mechanically operatively connected or operatively connectable to the wheel 14 for torque transmission. The prime mover 18 is axially parallel to the bottom bracket gearbox 10.

The planetary assembly includes a first planetary gear set 110 having a first rotary element in the form of a sun gear 112. The sun gear 112 forms the input of the planetary assembly and is permanently connected to the output 20 of the prime mover 18 for conjoint rotation. In addition, the first planetary gear set 110 has a second rotary element in the form of a planet carrier 114. The planet carrier 114 is permanently connected to a pinion 26 for conjoint rotation, the pinion forming a part of the primary drive 24. A chain or a belt of the primary drive 24 is mounted on the pinion in a mechanical operative connection. The planet carrier 114 therefore forms an output of the planetary assembly. In addition, the first planetary gear set 110 includes a third rotary element in the form of a ring gear 116. One or more planet gears 118, each of which meshes with the sun gear 112 and with the ring gear 116, is/are rotatably mounted on the planet carrier 114.

The ring gear 116 is rotationally fixable on the stationary component 22 by a first brake shift element B1. In the drive assembly 100, the first brake shift element B1 is in the form of a brake freewheel unit. When the prime mover 18 provides a drive torque for the wheel 14, the first brake shift element B1 automatically switches to the locking direction state. Therefore, a transmission ratio and a mechanical operative connection are provided between the prime mover 18 and the wheel 14. When a drive torque is not provided for the wheel 14, the first brake shift element B1 automatically switches to the overrun operation state and therefore allows the prime mover 18 to be decoupled from the secondary drive 16. Drag torque is reduced as a result.

Figure 2:
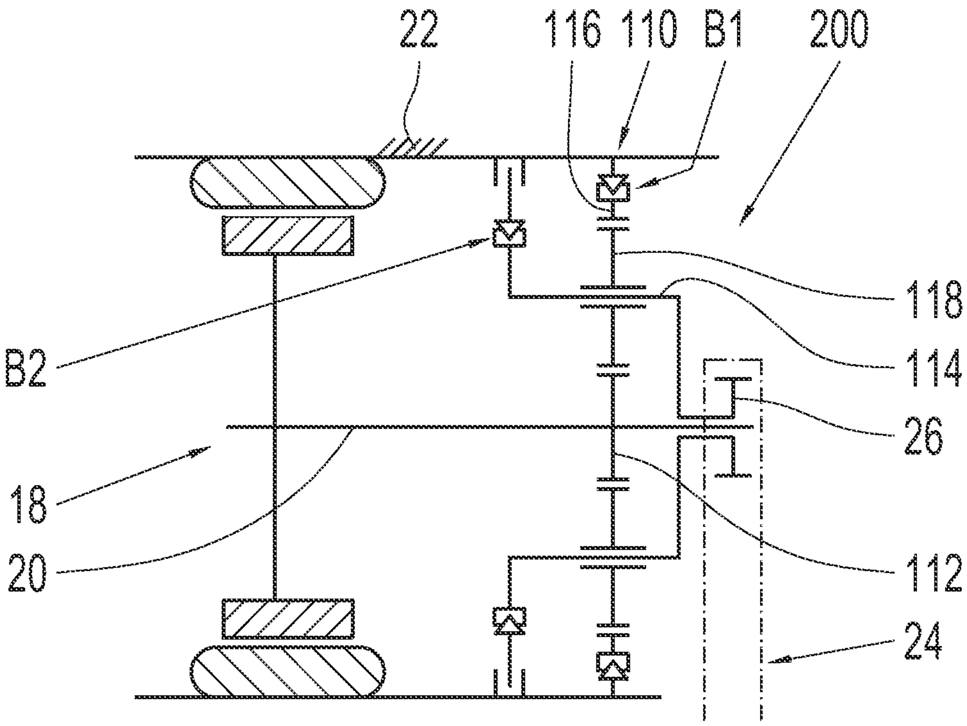
FIG. 2 shows a schematic view of a second example embodiment of the drive assembly of the bicycle.

FIG. 2 shows a second example embodiment of a drive assembly 200 of a bicycle, which is designed similarly to the first example embodiment. Therefore, only relevant differences are explained. In FIG. 2, the wheel 14, the bottom bracket gearbox 10 and the pedal crankshaft 12 are not shown and the secondary drive 16 is only partially shown.

The drive assembly 200 differs from the drive assembly 100 in that a second brake shift element B2 is additionally provided. The planet carrier 114 is rotationally fixable on the stationary component 22 by the second brake shift element B2. The second brake shift element B2 is in the form of a shiftable brake freewheel unit. In one example embodiment, the second brake shift element is actuated by a gear selector drum and, in another example embodiment by a magnet, which can be arranged on the outside of the stationary component 22.

Idle running and thus a decoupling of the prime mover 18 is achieved by shifting the second brake shift element B2. The first brake shift element B1 automatically switches to the overrun operation state while the wheel 14 is moving. In order to be able to provide a drive force from the prime mover 18 to the wheel 14, the first brake shift element B1 automatically switches to the locking direction state and thus rotationally fixes the ring gear 116 on the stationary component. If the second brake shift element B2 is actuated and thus the planet carrier 114 is rotationally fixed on the stationary component, a hill holder function can be made available, provided that the freewheel of the second brake shift element B2 engages. The hill holder function prevents the bicycle from rolling backwards on a hillside and prevents the respective rotary elements of the planetary assembly and thus the wheel 14 from rotating backwards, without the need to provide a holding force or a drive force from the prime mover 18 or a cyclist.

Figure 3:
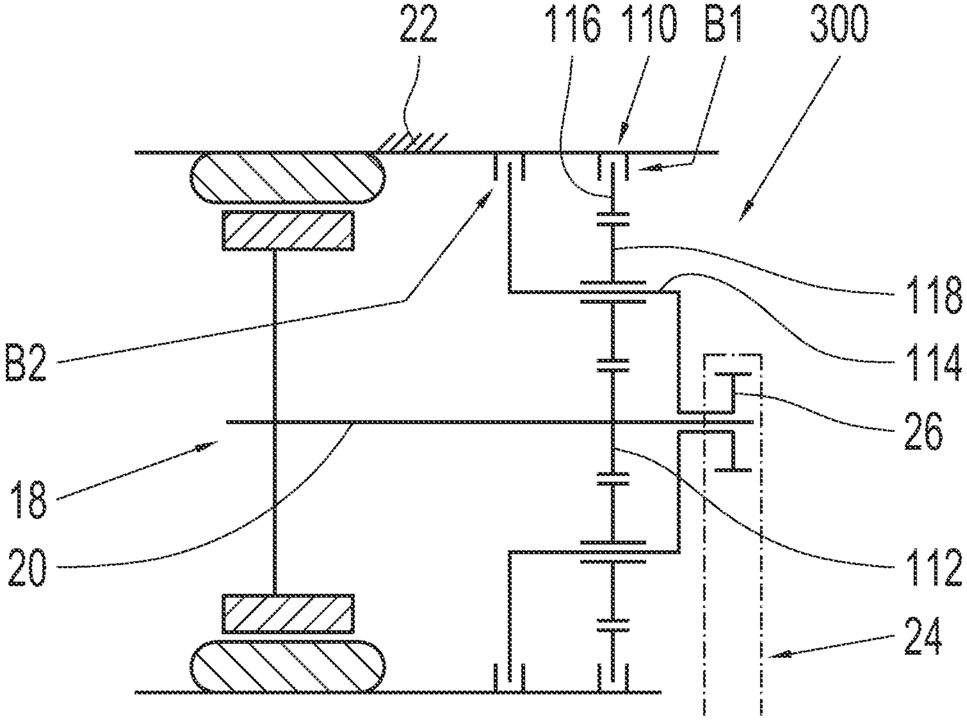
FIG. 3 shows a schematic view of a third example embodiment of the drive assembly of the bicycle.

FIG. 3 shows a third example embodiment of a drive assembly 300 of a bicycle, which is designed similarly to the second example embodiment. Therefore, only relevant differences are explained. In FIG. 3, the wheel 14, the bottom bracket gearbox 10 and the pedal crankshaft 12 are also not shown and the secondary drive 16 is only partially shown.

In the drive assembly 300, the first brake shift element B1 is in the form of a shiftable brake. In addition, the second brake shift element B2 is in the form of a shiftable brake. The planetary assembly of the drive assembly 300 therefore does not have a freewheel unit and must be actively engaged and disengaged in order to switch to each state.

In order to decouple from the prime mover 18 from the wheel 14, in the drive assembly 300, the first brake shift element B1 and the second brake shift element B2 are switched to their disengaged state, such that neither the ring gear 116 nor the planet carrier 114 is rotationally fixed on the stationary component 22. In order to provide a drive force at the wheel 14 by the prime mover 18, the first brake shift element B1 is actuated and thus the ring gear 116 is rotationally fixed on the stationary component. The second brake shift element B2 remains in the disengaged state, so that the planet carrier 114 can revolve. In order to provide a parking lock, the second brake shift element B2 is actuated and thus the planet carrier 114 is rotationally fixed on the stationary component 22. As a result, the output of the planetary assembly is locked. Therefore, the wheel 14, which is mechanically operatively connected to the planet carrier 114, can no longer rotate and is also locked. The first brake shift element B1 can be actuated or unactuated at this time.

In the example embodiment shown in FIG. 3, the first brake shift element B1 and the second brake shift element B2 are actuated via a gear selector drum.

Figure 4:
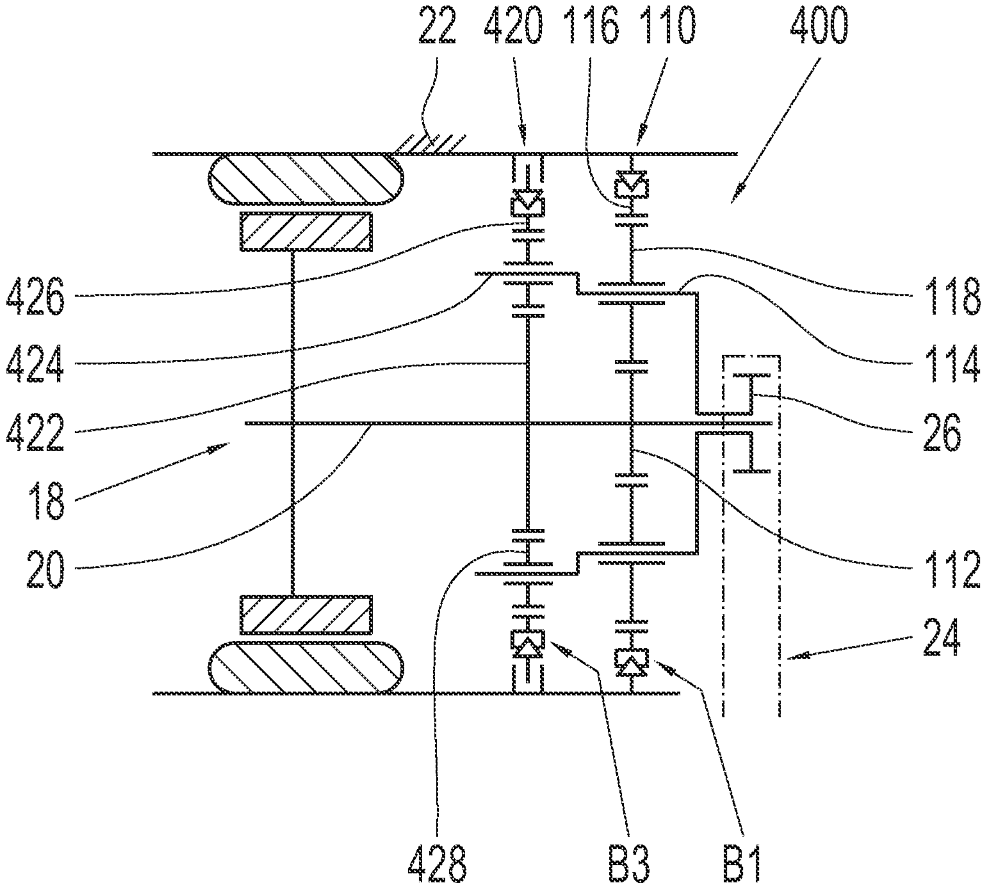
FIG. 4 shows a schematic view of a fourth example embodiment of the drive assembly of the bicycle.

FIG. 4 shows a fourth example embodiment of a drive assembly 400 of a bicycle, which is designed similarly to the first example embodiment. Therefore, only relevant differences are explained. In FIG. 4, the wheel 14, the bottom bracket gearbox 10 and the pedal crankshaft 12 are also not shown and the secondary drive 16 is only partially shown.

The drive assembly 400 has a second planetary gear set 420. The second planetary gear set 420 includes a fourth, a fifth, and a sixth rotary element. The fourth rotary element is in the form of a sun gear 422. The sun gear 422 of the second planetary gear set 420 is permanently connected to the output 20 of the prime mover 18 and thus to the sun gear 112 of the first planetary gear set 110 for conjoint rotation. The fifth rotary element is in the form of a planet carrier 424. The planet carrier 424 of the second planetary gear set 420 is permanently connected to the planet carrier 114 of the first planetary gear set 110 for conjoint rotation. The sixth rotary element is in the form of a ring gear 426. Respective planet gears 428 of the second planetary gear set 420 are rotatably mounted on the planet carrier 424. The planet gears 428 of the second planetary gear set 420 mesh with the ring gear 424 of the second planetary gear set 420 and thus with the sun gear 422 of the second planetary gear set 420.

In addition, the drive assembly 400 includes a third brake shift element B3. The second brake shift element B2 of the example embodiments according to FIG. 2 and FIG. 3 is dispensed with, however.

The third brake shift element B3 is in the form of a shiftable brake freewheel unit, similarly to the second brake shift element B2 in the example embodiment according to FIG. 2. Therefore, the drive assembly 400 can provide two transmission ratios and two gears for transmitting torque from the prime mover 18 to the wheel 14. For a first gear, the first brake shift element B1 automatically switches to the locking direction state when the third brake shift element B3 was disengaged or is unactuated and a drive force is provided by the prime mover 18. For the second gear, the first brake shift element B1 automatically switches to the overrun operation state when the third brake shift element B3 was actuated or engaged and a drive force is provided by the prime mover 18. In addition, the drive assembly 400 provides a hill holder function when the third brake shift element B3 was actuated or engaged and a difference between the drive force of the prime mover 18 and a force acting on the wheel 14 in the direction of backwards travel would otherwise result in the bicycle rolling backwards. In this case, the first brake shift element B1 automatically switches to the locking direction state and thus blocks the bicycle from rolling backwards.

In the example embodiment shown in FIG. 4, the first brake shift element B1 and the third brake shift element B3 are actuated via a gear selector drum.

Figure 5:
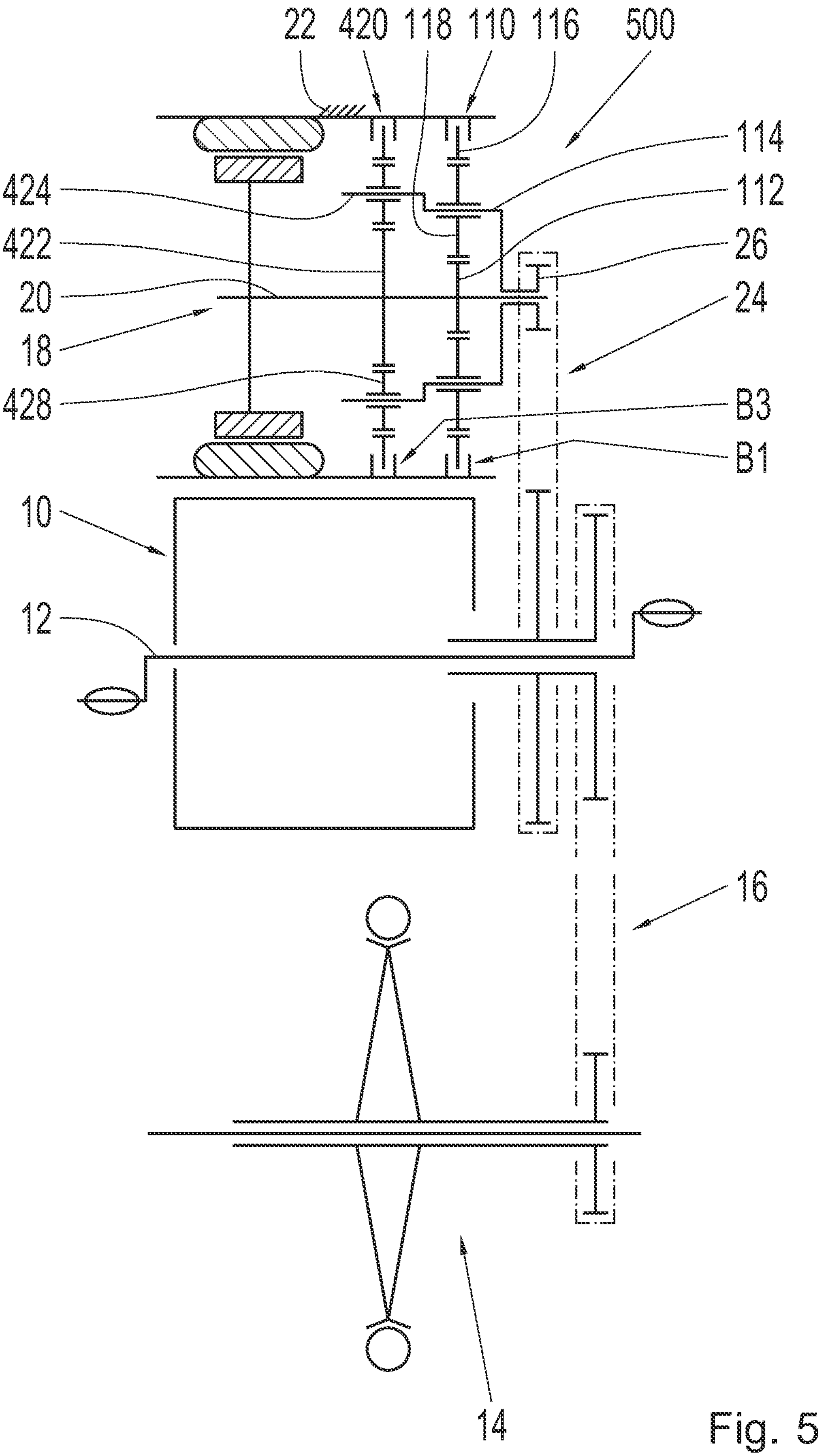
FIG. 5 shows a schematic view of a fifth example embodiment of the drive assembly of the bicycle.

FIG. 5 shows a fifth example embodiment of a drive assembly 500 of a bicycle, which is designed similarly to the fourth example embodiment. Therefore, only relevant differences are explained. In FIG. 5, the wheel 14, the bottom bracket gearbox 10, the pedal crankshaft 12 and the secondary drive 16 are fully shown once again.

In contrast to the drive assembly 400, the first brake shift element B1 and the third brake shift element B3 in the drive assembly 500 are each in the form of a shiftable brake. In the example embodiment shown in FIG. 5, the first brake shift element B1 and the third brake shift element B3 are actuated via a gear selector drum.

The prime mover 18 can therefore be decoupled in this example embodiment by way of the first brake shift element B1 and the third brake shift element B3 being unactuated or disengaged. A first gear for transmitting force between the prime mover 18 and the wheel 14 can be provided by actuating the first brake shift element B1. The third brake shift element B3 is then unactuated and, therefore, disengaged. A second gear for transmitting force between the prime mover 18 and the wheel 14 can be provided by actuating the third brake shift element B3.

The first brake shift element B1 is then unactuated and, therefore, disengaged. A parking lock can be provided by actuating and, therefore, engaging, the first brake shift element B1 and the third brake shift element B3.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

100; 200; 300; 400; 500 drive assembly
10 bottom bracket gearbox
12 pedal crankshaft
14 wheel
16 secondary drive
18 prime mover
20 output
22 stationary component
24 primary drive
26 pinion
110 first planetary gear set
112 sun gear
114 planet carrier
116 ring gear
118 planet gear
420 planetary gear set
422 sun gear
424 planet carrier
426 ring gear
428 planet gears
B1, B2; B3 brake shift element

The invention claimed is:

1. A drive assembly (100; 200; 300; 400; 500) for a bicycle, comprising:

a bottom bracket gearbox (10) with an input and an output, the bottom bracket gearbox (10) configured for transmitting torque to a wheel (14) of the bicycle;

a prime mover (18) having a prime mover output (20);

a planetary assembly (110, 412) configured to transmit torque from the prime mover output (20) of the prime mover (18) to the wheel (14) of the bicycle, the planetary assembly (110, 412) comprising:

a first planetary gear set (110) comprising a first rotary element, a second rotary element, and a third rotary element, the first planetary gear set (110) being a negative planetary gear set, the first rotary element being a first sun gear (112), the second rotary element being a first planet carrier (114), and the third rotary element being a first ring gear (116); and a second planetary gear set (420) with a fourth rotary element, a fifth rotary element, and a sixth rotary element, the second planetary gear set (420) being a negative planetary gear set with the fourth rotary element being a sun gear (422), the fifth rotary element being a planet carrier (424), and the sixth rotary element being a ring gear (426);

a stationary component (22);

a first brake shift element (B1); and a third brake shift element (B3), wherein the first rotary element is mechanically operatively connected to the prime mover output (20) of the prime mover (18), the second rotary element forms an output of the planetary assembly (110), and the third rotary element is rotationally fixable on the stationary component (22) by the first brake shift element (B1).

2. The drive assembly (100; 200; 300; 400; 500) of claim 1, wherein the second rotary element is mechanically operatively connected to the output of the bottom bracket gearbox (10).

3. The drive assembly (100; 200; 400) of claim 1, wherein the first brake shift element (B1) comprises a brake freewheel unit.

4. The drive assembly (300; 500) of claim 1, wherein the first brake shift element (B1) comprises a shiftable brake.

5. The drive assembly (200; 300) of claim 1, further comprising a second brake shift element (B2) via which either the first rotary element or the second rotary element is rotationally fixed on the stationary component (22).

6. The drive assembly (200) of claim 5, wherein the second brake shift element (B2) comprises a shiftable brake freewheel unit.

7. The drive assembly (300) of claim 5, wherein the second brake shift element (B2) comprises a shiftable brake.

8. The drive assembly (400; 500) of claim 1, wherein the fourth rotary element is mechanically operatively connected to the prime mover output (20) of the prime mover (18), the fifth rotary element is permanently connected to the second rotary element for conjoint rotation, and the sixth rotary element is rotationally fixable on the stationary component (22) by the third brake shift element (B3).

9. The drive assembly (400) of claim 1, wherein the third brake shift element (B3) comprises a shiftable brake freewheel unit.

10. The drive assembly (500) of claim 1, wherein the third brake shift element (B3) comprises a shiftable brake.

11. A bicycle comprising the drive assembly (100; 200; 300; 400; 500) of claim 1.

12. A drive assembly (100; 200; 300; 400; 500) for a bicycle, comprising:

a bottom bracket gearbox (10) with an input and an output, the bottom bracket gearbox (10) configured for transmitting torque to a wheel (14) of the bicycle;

a prime mover (18) having a prime mover output (20);

a planetary assembly (110, 412) configured to transmit torque from the prime mover output (20) of the prime mover (18) to the wheel (14) of the bicycle, the planetary assembly (110, 412) comprising a first planetary gear set (110) comprising a first rotary element, a second rotary element, and a third rotary element;

a stationary component (22);

a first brake shift element (B1); and a second brake shift element (B2) via which either the first rotary element or the second rotary element is rotationally fixed on the stationary component (22), wherein the first rotary element is mechanically operatively connected to the prime mover output (20) of the prime mover (18), the second rotary element forms an output of the planetary assembly (110), and the third rotary element is rotationally fixable on the stationary component (22) by the first brake shift element (B1).

13. The drive assembly (400; 500) of claim 12, wherein the planetary assembly (110; 420) comprises a second planetary gear set (420) with a fourth rotary element, a fifth rotary element, and a sixth rotary element.

14. The drive assembly (400) of claim 13, wherein the second planetary gear set (420) is a negative planetary gear set, the fourth rotary element being a sun gear (422), the fifth rotary element being a planet carrier (424), and the sixth rotary element being a ring gear (426).

15. The drive assembly (400; 500) of claim 13, further comprising a third brake shift element (B3), the sixth rotary element being rotationally fixable on the stationary component (22) by the third brake shift element (B3).

16. The drive assembly (400; 500) of claim 15, wherein the fourth rotary element is mechanically operatively connected to the prime mover output (20) of the prime mover (18) and the fifth rotary element is permanently connected to the second rotary element for conjoint rotation.

17. The drive assembly (200) of claim 12, wherein one or both of the first brake shift element (B1) or the second brake shift element (B2) comprises a shiftable brake freewheel unit.

18. The drive assembly (300) of claim 12, wherein one or both of the first brake shift element (B1) or the second brake shift element (B2) comprises a shiftable brake.

19. The drive assembly (300) of claim 12, wherein the first planetary gear set (110) is a negative planetary gear set, the first rotary element is a first sun gear (112), the second rotary element is a first planet carrier (114), and the third rotary element is a first ring gear (116).

20. A drive assembly (100; 200; 300; 400; 500) for a bicycle, comprising:

a bottom bracket gearbox (10) with an input and an output, the bottom bracket gearbox (10) configured for transmitting torque to a wheel (14) of the bicycle;

a prime mover (18) having a prime mover output (20);

a planetary assembly (110, 412) configured to transmit torque from the prime mover output (20) of the prime mover (18) to the wheel (14) of the bicycle, the planetary assembly (110, 412) comprising:

a first planetary gear set (110) comprising a first rotary element, a second rotary element, and a third rotary element; and a second planetary gear set (420) with a fourth rotary element, a fifth rotary element, and a sixth rotary element, the second planetary gear set (420) being a negative planetary gear set with the fourth rotary element being a sun gear (422), the fifth rotary element being a planet carrier (424), and the sixth rotary element being a ring gear (426);

a stationary component (22);

a first brake shift element (B1); and a third brake shift element (B3), wherein the first rotary element is mechanically operatively connected to the prime mover output (20) of the prime mover (18), the second rotary element forms an output of the planetary assembly (110), and the third rotary element is rotationally fixable on the stationary component (22) by the first brake shift element (B1), and wherein the fourth rotary element is mechanically operatively connected to the prime mover output (20) of the prime mover (18), the fifth rotary element is permanently connected to the second rotary element for conjoint rotation, and the sixth rotary element is rotationally fixable on the stationary component (22) by the third brake shift element (B3).

* * * * *